(12) United States Patent
Yin et al.

(10) Patent No.: US 9,753,655 B2
(45) Date of Patent: Sep. 5, 2017

(54) COMPUTING SYSTEM WITH WRITE BUFFER INCLUDING SPECULATIVE STORAGE WRITE AND METHOD OF OPERATION THEREOF

(71) Applicant: Samsung Electronics Co., Ltd., Suwon-si, Gyeonggi-Do (KR)

(72) Inventors: Liang Yin, San Jose, CA (US); Zvi Guz, Palo Alto, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 162 days.

(21) Appl. No.: 14/735,765

(22) Filed: Jun. 10, 2015

(65) Prior Publication Data

US 2016/0188224 A1    Jun. 30, 2016

Related U.S. Application Data

(60) Provisional application No. 62/098,248, filed on Dec. 30, 2014.

(51) Int. Cl.
*G06F 12/00* (2006.01)
*G06F 3/06* (2006.01)

(52) U.S. Cl.
CPC .......... *G06F 3/0613* (2013.01); *G06F 3/0656* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 5,638,534 | A | 6/1997 | Mote |
| 6,122,715 | A * | 9/2000 | Palanca ............... G06F 12/0804 711/154 |
| 6,415,353 | B1 * | 7/2002 | Leung ................. G06F 12/0893 365/222 |
| 6,735,139 | B2 | 5/2004 | Tang |
| 7,370,161 | B2 * | 5/2008 | Kim ..................... G06F 13/1647 365/230.03 |
| 8,495,286 | B2 | 7/2013 | Balkesen et al. |
| 2010/0238938 | A1 * | 9/2010 | Zhou ....................... H04L 49/10 370/394 |

* cited by examiner

*Primary Examiner* — John A Lane
(74) *Attorney, Agent, or Firm* — IP Investment Law Group (57) ABSTRACT

A computing system includes: a write buffer block configured to: receive a data in a write buffer entry for staging the data prior to transferring the data to a storage cell, determine a validity identification of the data for a buffer entry address of the write buffer entry, store the data based on the validity identification to the write buffer entry, and a memory computing block, coupled to the write buffer block, configured to read the data for accessing the write buffer block.

18 Claims, 5 Drawing Sheets

COMPUTING SYSTEM WITH WRITE BUFFER INCLUDING SPECULATIVE STORAGE WRITE AND METHOD OF OPERATION THEREOF

CROSS-REFERENCE TO RELATED APPLICATION(S)

This application claims the benefit of U.S. Provisional Patent Application Ser. No. 62/098,248 filed Dec. 30, 2014, and the subject matter thereof is incorporated herein by reference thereto.

TECHNICAL FIELD

An embodiment of the present invention relates generally to a computing system, and more particularly to a system with buffer mechanism.

BACKGROUND

Modern consumer and industrial electronics, such as computing systems, servers, appliances, televisions, cellular phones, automobiles, satellites, and combination devices, are providing increasing levels of functionality to support modern life. While the performance requirements can differ between consumer products and enterprise or commercial products, there is a common need for efficient memory usage and data computation.

Research and development in the existing technologies can take a myriad of different directions. Some have taken writing data directly to storage cells. Others provide data buffers within the processors. However, latency resulting in performance loss in existing technologies reduces the benefit of using the device.

Thus, a need still remains for a computing system with buffer mechanisms for efficiently store and retrieve data. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested more efficient solutions and, thus, solutions to these problems have long eluded those skilled in the art.

SUMMARY

An embodiment of the present invention provides a computing system, including: a write buffer block configured to: receive a data in a write buffer entry for staging the data prior to transferring the data to a storage cell, determine an validity identification of the data for a buffer entry address of the write buffer entry, store the data based on the validity identification to the write buffer entry, and a memory computing block, coupled to the write buffer block, configured to read the data from the write buffer block.

An embodiment of the present invention provides a computing system, including: a host processor configured to: generate a data, execute a write request to be sent based on a number of a write buffer entry meeting or exceeding a usage threshold, and a host interface, coupled to the host processor, configured to communicate the write request for transferring the data to a write buffer block prior to transferring the data to a storage cell within a memory block.

An embodiment of the present invention provides a method of operation of a computing system, including: receiving a data in a write buffer entry for staging the data prior to transferring the data to a storage cell; determining an validity identification of the data for a buffer entry address of the write buffer entry; storing the data with a write buffer block based on the validity identification to the write buffer entry; and reading the data for accessing the write buffer block.

An embodiment of the present invention provides a method of operation of a computing system, including: generating a data with a host processor; executing a write request to be sent based on a number of a write buffer entry meeting or exceeding a usage threshold; and communicating the write request for transferring the data to a write buffer block prior to transferring the data to a storage cell within a memory block.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Various example embodiments include writing a data to a write buffer block for improving an operation of the computing system thereby reducing data write latency. Since the data can be written to the write buffer block immediately, the write recovery time (tWR) can essentially be reduced to zero, thus, improving a write operation. As a result, the host device can continue operating without being delayed by the write latency.

Various example embodiments include a host device performing a read operation of the same data to be written without the latency, where the data would not otherwise be immediately available without the write buffer entry. The write buffer block can improve the read turnaround time for the same data by allowing a memory computing block to access the data more quickly from the write buffer block, instead of a storage cell.

The following embodiments are described in sufficient detail to enable those skilled in the art to make and use the invention. It is to be understood that other embodiments would be evident based on the present disclosure, and that system, process, architectural, or mechanical changes can be made without departing from the scope of an embodiment of the present invention.

In the following description, numerous specific details are given to provide a thorough understanding of the various embodiments of the invention. However, it will be apparent that various embodiments may be practiced without these specific details. In order to avoid obscuring various embodiments, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "module" referred to herein can include software, hardware, or a combination thereof in an embodiment of the present invention in accordance with the context in which the term is used. For example, a software module can be machine code, firmware, embedded code, and/or application software. Also for example, a hardware module can be circuitry, processor(s), computer(s), integrated circuit(s), integrated circuit cores, pressure sensor(s), inertial sensor(s), microelectromechanical system(s) (MEMS), passive devices, or a combination thereof. Further, if a module is written in the apparatus claims section, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Figure 1:
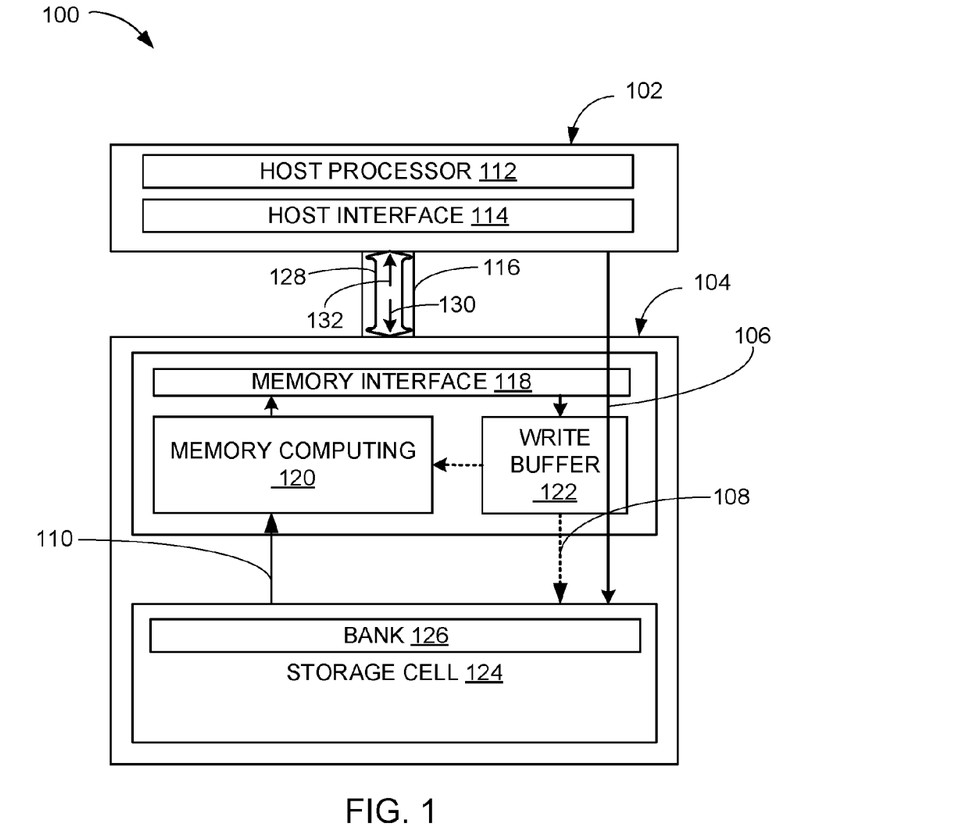
FIG. 1 is a computing system with a buffer mechanism in an embodiment of the present invention.

Referring now to FIG. 1, therein is shown a computing system 100 with a buffer mechanism in an embodiment of the present invention. The computing system 100 can include a host device 102 and a memory block 104. The host device 102 interacts with the memory block 104. For example, the host device 102 can provide a data 106 representing a write data 108 for storing in the memory block 104. For another example, the host device 102 can receive the data 106 representing a read data 110 as an output from the memory block 104.

The host device 102 can include a host processor 112. The host processor 112 provides compute capabilities for the host device 102. For example, the host processor 112 can generate the data 106. The host device 102 can include a host interface 114. The host interface 114 communicates with the memory block 104. For example, the host interface 114 transmits the data 106 representing the write data 108 to the memory block 104 via a communication bus 116. The host interface 114 can also receive a return value, such as the read data 110, generated by the memory block 104 for the host device 102.

The communication bus 116 provides communication between the host device 102 and the memory block 104. For example, the communication bus 116 can represent an address bus, a data bus, a control bus, or a combination thereof. For further example, the communication bus 116 can represent a random access memory (RAM) bus, a peripheral component interconnect (PCI) bus, an accelerated graphics port (AGP) bus, various other buses, or a combination thereof. For another example, the communication bus 116 can include an Industry Standard Architecture (ISA) bus, a Micro Channel Architecture (MCA) bus, an Extended Industry Standard Architecture (ESA) bus, or a combination thereof.

The memory block 104 provides access to and stores the data 106. The memory block 104 can also provide a computational resource to the computing system 100 as well.

The memory block 104 can be implemented with hardware, such as logic gates or circuitry (analog or digital). Also for example, the memory block 104 can be implemented with a hardware finite state machine, combinatorial logic, or a combination thereof.

The memory block 104 can represent a random access memory (RAM) device or core. As a core, the memory block 104 can be integrated into a larger device (such as an integrated circuit device, a processor, an application specific standard product, an application specific integrated circuit, a system on a chip, or a combination thereof). The memory block 104 can include volatile memory, such as a dynamic random access memory (DRAM). The memory block 104 can also comprise nonvolatile memory, such as a solid state flash memory, phase-change RAM (PRAM), magnetoresistive RAM (MRAM), spin-transfer torque MRAM (STT-MRAM), resistive RAM (ReRAM), or etcetera. For further example, the memory block 104 can represent a hybrid memory cube (HMC), a hybrid bandwidth memory (HBM), or a combination thereof.

The memory block 104 can include a memory interface 118, a memory computing block 120, a write buffer block 122, and a storage cell 124. The memory interface 118 provides input/output functionality for the memory block 104. The memory computing block 120 provides compute capabilities for the memory block 104. The memory computing block 120 can be a processor, an embedded processor, a microprocessor, a hardware control logic, a hardware finite state machine (FSM), a digital signal processor (DSP), and field-programmable gate array (FPGA), or a combination thereof. The write buffer block 122 holds the data 106 prior to being written to the storage cell 124. Details regarding the write buffer block 122 will be discussed below.

The storage cell 124 stores the data 106 for the memory block 104. The storage cell 124 can include a bank 126. The bank 126 is a logical or physical unit of storage. For example, the bank 126 can include a configuration organized in a column, a row, or a combination thereof.

The memory interface 118 can receive the data 106 as an input through the communication bus 116 from the host device 102. The memory interface 118 can send the data 106 as an output through the communication bus 116 to the host device 102.

The memory interface 118 can communicate the data 106 to the write buffer block 122 as illustrated by solid arrow line from the memory interface 118 to the write buffer block 122. The memory interface 118 can communicate to receive the read data 110 from the memory computing block 120.

The memory interface 118 can be implemented in a number of ways. As an example, the memory interface 118 can provide physical layer support (such as electrical interface or optical interface or acoustic interface). The memory interface 118 can also provide protocol support (such as electrical, optical, or acoustic timing). The memory interface 118 can further provide processing of some of the information received, or format information being sent out as output, as will be described in detail in FIG. 2.

The write buffer block 122 can be embedded within the memory block 104. For example, the write buffer block 122 can receive the write data 108 from the memory interface 118. Subsequently, the write buffer block 122 can write the data 106 to the memory computing block 120, the storage cell 124, or a combination thereof. More specifically as an example, dotted arrow lines from the write buffer block 122 to the memory computing block 120 and the storage cell 124 can indicate the data 106 being transferred. Further details for the write buffer block 122 will be discussed below.

The memory computing block 120 can be embedded inside the memory block 104. As an example, the memory computing block 120 can receive the read data 110 from the storage cell 124 as illustrated by a solid arrow line from the storage cell 124 to the memory computing block 120. The memory computing block 120 can also receive the read data 110 from the write buffer block 122 as illustrated by a dotted arrow line from the write buffer block 122.

The memory computing block 120 can control the timing to communicate the data 106 to the memory interface 118, as illustrated by a solid arrow line, by the data 106 being staged at the write buffer block 122. More specifically as an example, the read data 110 from the write buffer block 122 can be obtained faster than the read data 110 from the storage cell 124. If the memory block 104 includes a synchronous interface, the memory computing block 120 can hold or stage the read data 110 from the write buffer block 122 to align with the read data 110 from the storage cell 124. More specifically as an example, if the memory interface 118 is synchronous, in which the data 106 is returned in a fixed amount of delay after receiving a request 128, the memory computing block 120 can stage the read data 110 returned from the write buffer block 122 to align with the read data 110 returned from the storage cell 124 to match the timing of the normal data return path.

The request 128 can represent a command to seek an output. For example, the request 128 can include a write request 130, a read request 132, or a combination thereof communicated by the host processor 112. The write request 130 can represent the command to transfer the data 106 to the storage cell 124, the write buffer block 122, or a combination thereof. Details regarding the write request 130 will be discussed below.

The read request 132 can represent the command to obtain the data 106 from the storage cell 124, the write buffer block 122, or a combination thereof. More specifically as an example, if the data 106 requested by the read request 132 exists in the write buffer block 122, the data 106 from the write buffer block 122 can be returned as illustrated by the dotted arrow line from the write buffer block 122 to the memory computing block 120 instead of the data 106 from the storage cell 124.

Figure 2:
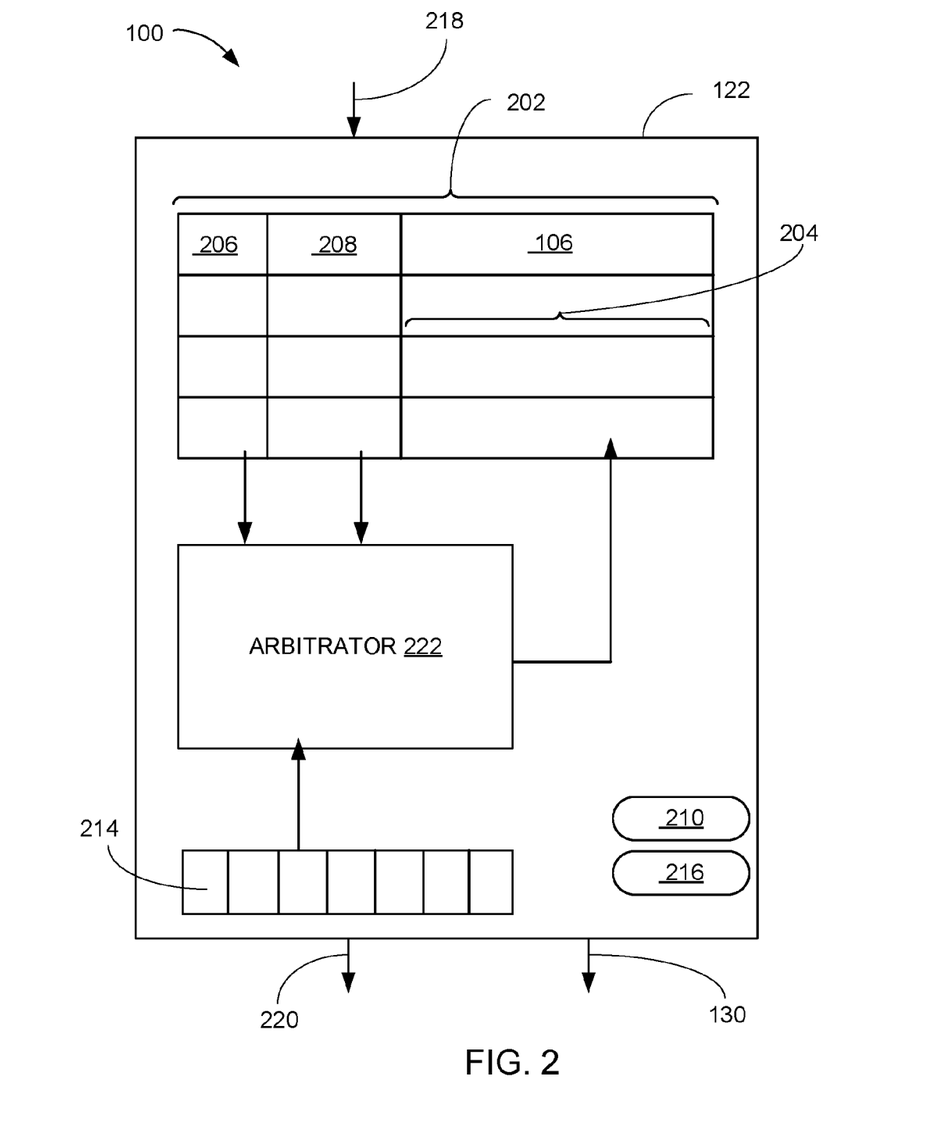
FIG. 2 is a write flow as an embodiment of the present invention

Referring now to FIG. 2, therein is shown a write flow as an embodiment of the present invention. The write buffer block 122 can represent a static random access memory (SRAM) or any other non-volatile technology. The write buffer block 122 can hold a plurality of a write buffer entry 202. The write buffer entry 202 is a data entry slot for the write buffer block 122. For example, the write buffer entry 202 can have a width equal to or larger than the width of the write data 108 of FIG. 1 to the memory block 104 of FIG. 1 representing the DRAM.

The write buffer entry 202 can include a plurality of an entry field 204 to organize the data 106. The entry field 204 can include a validity identification 206, a buffer entry address 208, the data 106, or a combination thereof. The buffer entry address 208 is information to locate the data 106 in the write buffer block 122. The entry field 204 for the data 106 can include an error-correcting code.

The validity identification 206 indicates that the data 106 is available to be written to the memory block 104. The validity identification 206 can also indicate a valid checksum, syndrome, or a combination thereof within the entry field 204 for the data 106.

Each instance of the write data 108 can have the validity identification 206. The validity identification 206 can be represented as a bit or multiple bits. More specifically as an example, if the width of the write buffer entry 202 is wider than the width of the write data 108, the validity identification 206 can be represented in multiple bits.

At reset time, the validity identification 206 can be cleared. More specifically as an example, the reset time can represent timing when the write buffer block 122 is available for a new instance of the data 106.

The buffer entry address 208 can include information such as a target, a rank, the bank 126 of FIG. 1, row, or column. Each instance of the write buffer entry 202 can be identified by the buffer entry address 208. For a further example, the write buffer entry 202 can represent a write address for the write data 108 if the write buffer entry 202 has the same width as the write data 108.

The host processor 112 of FIG. 1 can control the number of instances of the write request 130 sent to the write buffer block 122 to avoid the write buffer block 122 from being overrun with too many instances of the write request 130. More specifically as an example, the memory block 104 can communicate a usage threshold 210 to indicate the occupancy of write buffer entry 202. The usage threshold 210 is a maximum number of the write buffer entry 202 that the write buffer block 122 can hold, to throttle the number of the write request 130.

For example, the number of used instances of the write buffer entry 202 with the validity identification 206 of FIG. 2 set can meet or exceed the usage threshold 210. As a result, the memory block 104 can communicate to the host processor 112 to stop, limit, or a combination thereof the write request 130 to the memory block 104 until the number of the write buffer entry 202 is below the usage threshold 210. More specifically as an example, the host processor 112 can be aware of the pending instances of the request 128 of FIG. 1 currently made to the memory block 104, the write buffer block 122, or a combination thereof. As a result, the host processor 112 can be aware of the write buffer entry 202 that is available to transfer the data 106. Details will be discussed below.

As illustrated in FIG. 1 by a solid arrow line from the memory interface 118 to the write buffer block 122, the write data 108 can go through the write buffer block 122 prior to be written to the storage cell 124 of FIG. 1. More specifically as an example, if the write buffer block 122 represents an SRAM, the data 106 can be written immediately to report a write operation to be done. For example, writing immediately can represent, essentially, zero nanoseconds.

It has been discovered that embodiments of writing the data 106 to the write buffer block 122 improves the operation of the computing system 100 by reducing a data write latency to minimum. Since the data 106 can be written to the write buffer block 122 immediately, the write recovery time (tWR) can essentially be reduced to zero, thus, improving the write operation. As a result, the host device 102 can continue operating without being delayed by the write latency.

It has been further discovered that embodiments of the host device 102 can perform a read operation of the same data to be written without the latency compared to where the data 106 would not be available without the write buffer entry 202. The write buffer block 122 can improve the read turnaround time for the same data 106 by allowing the memory computing block 120 of FIG. 1 to access the data 106 more quickly from the write buffer block 122 instead of the storage cell 124.

For a specific example, when the memory block 104 of FIG. 1 receives the write request 130 of FIG. 1 from the host device 102 of FIG. 1, the memory block 104 can look up the write buffer block 122 to determine if the validity identification 206 of the data 106 represents "set" for the buffer entry address 208. The validity identification 206 can indicate whether the data 106 is already stored in the write buffer entry 202 or not.

If there is already an instance of the write buffer entry 202 for the data 106, a previous instance of the write request 130 had already made the write buffer entry 202 for the data 106. As a result, the validity identification 206 can represent "set.' The new or subsequent instance of the write request 130 will reuse the same instance of the write buffer entry 202 but overwrite the data 106 already in the write buffer entry 202 with the data 106 from the new instance of the write request 130.

If there is no instance of the write buffer entry 202 for the data 106, thus the validity identification 206 represents "not set," the write buffer block 122 can select a new empty instance of the write buffer entry 202 with a different instance of the buffer entry address 208 to store the data 106. The validity identification 206 can also be set to be written, read, or a combination thereof from the write buffer block 122.

For further example, based on tWR of zero, the host processor 112 of FIG. 1 has no write recovery time constraint. More specifically as an example, the host processor 112 can issue other operations including the read request 132 of FIG. 1 or the write request 130 of FIG. 1 to the same instance of the write buffer entry 202 or to the memory block 104.

As illustrated in FIG. 1 by a dotted arrow line from the write buffer block 122 to the storage cell 124 of FIG. 1, the write data 108 can be written to the storage cell 124 after being staged at the write buffer block 122. The host processor 112 or the memory computing block 120 can determine whether the write data 108 can be written to the storage cell 124 based on a bank busy flag 214. The bank busy flag 214 qualifies which of the write buffer entry 202 can be written to the storage cell 124.

For example, as illustrated in FIG. 2, the write buffer block 122 can maintain the bank busy flag 214. If the host processor 112 is sending the request 128 to a specific instance of the bank 126 within the storage cell 124, the corresponding bit(s) representing the bank busy flag 214 can be set. By setting the bank busy flag 214, the write buffer block 122 will not be allowed to transfer the data 106 to the bank 126. Instead, the write buffer block 122 can transfer the data 106 to other instances of the bank 126 without the bank busy flag 214 being set.

The write buffer block 122 can write the data 106 to the storage cell 124. More specifically as an example, if a corresponding instance of the bank 126 within the storage cell 124 is without conflict to pending or incoming transaction, the write buffer block 122 can write to the storage cell 124. As illustrated in FIG. 1, the dotted line from the write buffer block 122 to the storage cell 124 can illustrate the write data 108 being written to the storage cell 124.

A conflict status 216 represents a condition of whether multiple instances of the request 128 are interfering with each other. For example, as discussed above, if one instance of the request 128 is attempting to write the data 106 to the bank 126, and another instance of the request 128 is attempting to write the data 106 to the same instance of the bank 126, the multiple attempts to write to the same instance of the bank 126 can be represented in the conflict status 216 as a conflict. If another instance of the request 128 is attempting to write the data 106 to a different instance of the bank 126, the conflict status 216 can represent no or without conflict.

The write buffer block 122 can write the data 106 in a number of ways. For example, the write buffer block 122 can write the data 106 based on the bank busy flag 214. As discussed above, the bank busy flag 214 can constrain which instance of the write buffer entry 202 can be written to the storage cell 124. More specifically as an example, if the host processor 112 is sending the request 128 to a certain instance of the bank 126 and the corresponding instance of the bank busy flag 214 is set, then the write buffer block 122 will not be allowed to transfer the data 106 to the same instance of the bank 126. Moreover, the write buffer block 122 can write the data 106 targeting other instances of the bank 126 without the bank busy flag 214 being set.

The host processor 112 or the memory computing block 120 can update the bank busy flag 214. More specifically as an example, if the host processor 112 can control the scheduling of the request 128 to the bank 126, the host processor 112 can update the value of the bank busy flag 214 for the bank 126 with a bank update command 218. The bank update command 218 updates the value of the bank busy flag 214. When the request 128 is made to the bank 126, the host processor 112 can be aware that the bank 126 is unavailable for a predefined period. For example, the predefined period can be less than or equal to 100 nanoseconds.

The write buffer entry 202 can be released after the data 106 has been moved to the storage cell 124. More specifically as an example, the validity identification 206 can be reset when the write buffer entry 202 is released to allow the write buffer entry 202 to be available for a new instance of the request 128.

For a different example, the memory block 104 can track the request 128 coming from the host processor 112. The write buffer block 122 can include an arbitrator 222. More specifically as an example, if the request 128 from the host processor 112 provides the conflict status 216 of no conflict with pending instances of the write request 130 in the write buffer block 122, the arbitrator 222 can decide one of the pending instances of the write buffer entry 202 can be selected for a speculative storage write 220 to the storage cell 124. The speculative storage write 220 is a command to write the write buffer entry 202 to the storage cell 124 without conflict with the write request 130.

The memory block 104 including the arbitrator 222 can preempt the speculative storage write 220 from being completed based on the conflict status 216 between the speculative storage write 220 and any future instance of the request 128 that is not an instance of the speculative storage write 220. For example, the extent of the future can represent before the speculative storage write 220 is complete. More specifically as an example, the memory block 104 can process two different types of transaction simultaneously because of the parallel structure of the memory block 104.

The conflict status 216 can indicate a conflict can exist if the request 128 is targeting the same instance of the bank 126 as the speculative storage write 220. The memory block 104 including the arbitrator 222 can preempt the speculative storage write 220 from transferring the data 106 to the storage cell 124 and permit the request 128 to complete the transfer of the data 106 to the storage cell 124. The write buffer entry 202 selected for the speculative storage write 220 can be retried after the memory block 104 preempted the data 106 from being transferred to the storage cell 124. If there is no conflict in the process, the data 106 from the write buffer entry 202 that has been selected can be transferred to the storage cell 124 and the write buffer entry 202 can be retired successfully.

Figure 3:
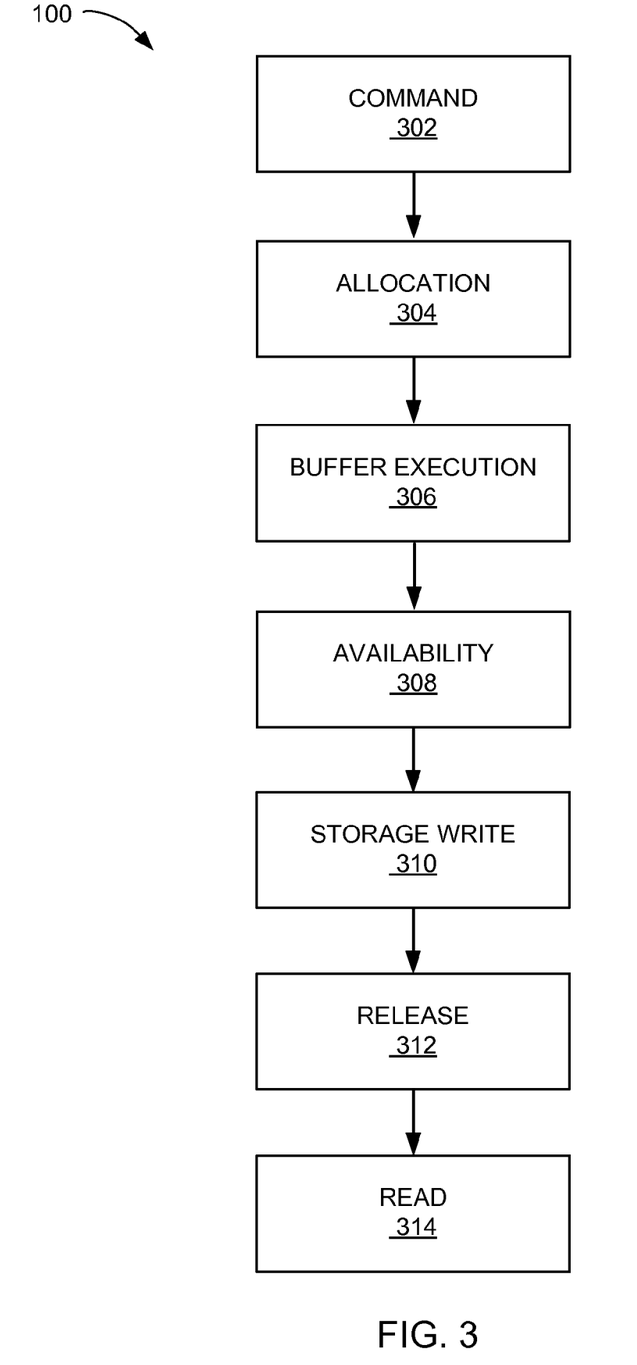
FIG. 3 is a control flow the computing system.

Referring now to FIG. 3, therein is shown a control flow of the computing system 100. The computing system 100 can include a command module 302. The command module 302 communicates the request 128 of FIG. 1. For example, the command module 302 can communicate the request 128 based on the write buffer entry 202 of FIG. 2, the usage threshold 210 of FIG. 2, or a combination thereof. The command module 302 can be executed by the host processor 112 of FIG. 1, the memory computing block 120 of FIG. 1, or a combination thereof.

More specifically as an example, the command module 302 can control the request 128 being sent based on the comparison between the number of write buffer entries 202 within the write buffer block 122 being used and the usage threshold 210. As discussed above, if the number of the write buffer entry 202 used meets or exceeds the usage threshold 210, the command module 302 can withhold the request 128 from being communicated to the memory block 104. In contrast, if the number of the write buffer entry 202 used is below the usage threshold 210, the command module 302 can communicate the request 128 to the memory block 104.

The computing system 100 can include an allocation module 304, which can be coupled to the command module 302. The allocation module 304 determines the validity identification 206 of FIG. 2. For example, the allocation module 304 can determine the validity identification 206 of the data 106 of FIG. 1 based on the buffer entry address 208 of FIG. 2, the request 128, or a combination thereof. The allocation module 304 can be executed by the memory block 104.

More specifically as an example, the allocation module 304 can determine the validity identification 206 based on whether the write buffer entry 202 is allocated for the particular instance of the data 106. If the write buffer entry 202 is allocated, the allocation module 304 can determine the validity identification 206 as "set." In contrast, if the write buffer entry 202 is not allocated, the allocation module 304 can determine the validity identification 206 as "not set."

The computing system 100 can include a buffer execution module 306, which can be coupled to the allocation module 304. The buffer execution module 306 operates on the data 106. For example, the buffer execution module 306 can overwrite the data 106 in the write buffer entry 202. The buffer execution module 306 can be executed by the write buffer block 122.

The buffer execution module 306 can operate on the data 106 in a number of ways. For example, the buffer execution module 306 can overwrite the data 106 based on the validity identification 206 representing that the write buffer entry 202 already includes the instance of the data 106 in the write request 130 of FIG. 1 newly received by the memory block 104. As a result, the buffer execution module 306 can overwrite the data 106 already in the write buffer entry 202 with the data 106 included in the write request 130.

For a different example, the buffer execution module 306 can select the write buffer entry 202 based on the validity identification 206. More specifically as an example, the validity identification 206 can indicate that the data 106 included in the write request 130 has not been stored in the write buffer entry 202. As a result, the buffer execution module 306 can select the write buffer entry 202 with a new instance of the buffer entry address 208 to store the data 106.

The computing system 100 can include an availability module 308, which can be coupled to the buffer execution module 306. The availability module 308 determines if the storage cell 124 of FIG. 1 is available. For example, the availability module 308 can determine if the bank 126 is available based on the bank busy flag 214 of FIG. 2, the request 128, or a combination thereof. The availability module 308 can be executed by the host processor 112, the memory block 104, or a combination thereof.

More specifically as an example, if the bank busy flag 214 is set, the availability module 308 can determine that the bank 126 is unavailable. In contrast, if the bank busy flag 214 is not set, the availability module 308 can determine that the bank 126 is available.

The computing system 100 can include a storage write module 310, which can be coupled to the availability module 308. The storage write module 310 writes the data 106. For example, the storage write module 310 can write the data 106 to the storage cell 124. The storage write module 310 can be executed by the write buffer block 122, the storage cell 124, or a combination thereof.

The storage write module 310 can write the data 106 in a number of ways. For example, the storage write module 310 can write the data 106 to the bank 126 based on the write buffer entry 202, the bank busy flag 214, or a combination thereof. More specifically as an example, as discussed above, the bank busy flag 214 can indicate whether the bank 126 is available for the data 106 to be written. Furthermore, the validity identification 206 included in the write buffer entry 202 can indicate that the data 106 is available to be written to the bank 126. If the bank busy flag 214 is not set, the validity identification 206 can indicate that the data 106 as available. As a result, the storage write module 310 can write the data 106 to the storage cell 124.

For a different example, the storage write module 310 can execute the speculative storage write 220 of FIG. 2 based on the conflict status 216, the write buffer entry 202, or a combination thereof. More specifically as an example, if the conflict status 216 indicates there is a conflict between the speculative storage write 220 and the write request 130, the storage write module 310 can preempt the speculative storage write 220 from transferring the data 106 to the storage cell 124. Rather, the storage write module 310 can write the data 106 from the write request 130 for the data 106 to be transferred to the storage cell 124. In contrast, if the conflict status 216 indicates no conflict, the storage write module 310 can execute the speculative storage write 220 to transfer the data 106 from the write buffer entry 202 selected to the storage cell 124.

The computing system 100 can include a release module 312, which can be coupled to the storage write module 310. The release module 312 releases or makes available the write buffer entry 202. For example, the release module 312 can release the write buffer entry 202 based on the data 106 being transferred to the storage cell 124. More specifically as an example, the release module 312 can release the write buffer entry 202 to store the data 106 from a new instance of the request 128. The release module 312 can be executed by the host processor 112, the memory block 104, or a combination thereof.

The computing system 100 can include a read module 314. The read module 314 reads the data 106. For example, the read module 314 can read the data 106 from the write buffer block 122, the storage cell 124, or a combination thereof. The read module 314 can be executed by the memory computing block 120.

The read module 314 can read the data 106 in a number of ways. For example, if the data 106 requested by the read request 132 of FIG. 1 exists in the write buffer block 122, the read module 314 can read the data 106 from the write buffer block 122. If the data 106 does not exist in the write buffer block 122, the read module 314 can read the data from the storage cell 124.

Figure 4:
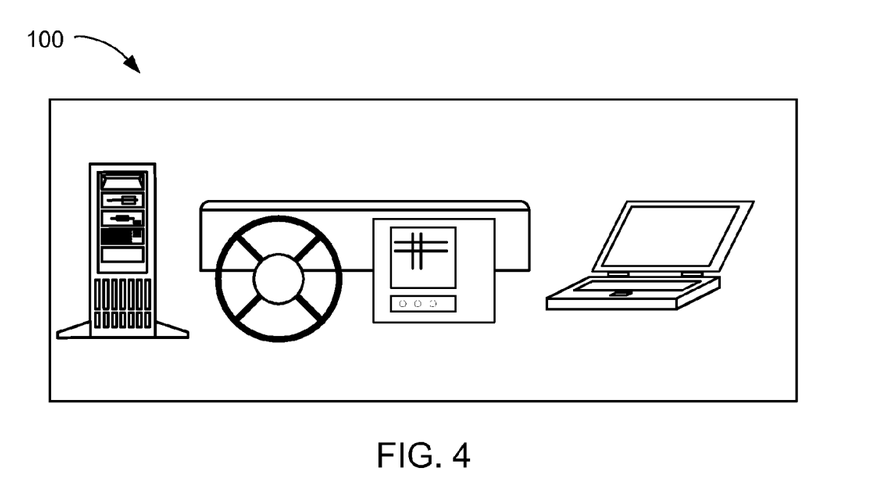
FIG. 4 is application examples of the computing system as with an embodiment of the present invention.

Referring now to FIG. 4, therein are application examples of the computing system 100 with an embodiment of the present invention. FIG. 4 depicts various embodiments, as examples, for the computing system 100, such as a computer server, a dash board/control center of an automobile, a smartphone, a mobile device, notebook computer, and the like.

These application examples illustrate the importance of the various embodiments of the present invention to provide improved efficiency for writing and reading the data 106 of FIG. 1. The host device 102 of FIG. 1 can transfer the data 106 to the write buffer block 122 of FIG. 1 before transferring the data 106 to the storage cell 124 of FIG. 1. The tWR can be reduced essentially to zero based on having the data 106 stored in the write buffer block 122 instead of the storage cell 124. This is accomplished by the memory computing block 120 of FIG. 1 being able to read the data 106 from the write buffer block 122 instead of the storage cell 124. Transferring the data 106 to the write buffer block 122 improves efficiency by reducing the latency from transferring the data 106 to the storage cell 124.

The computing system 100, such as the computer server, the dash board, and the notebook computer, can include a one or more of a subsystem (not shown), such as a printed circuit board having various embodiments of the present invention or an electronic assembly having various embodiments of the present invention. The computing system 100 can also be implemented as an adapter card.

Figure 5:
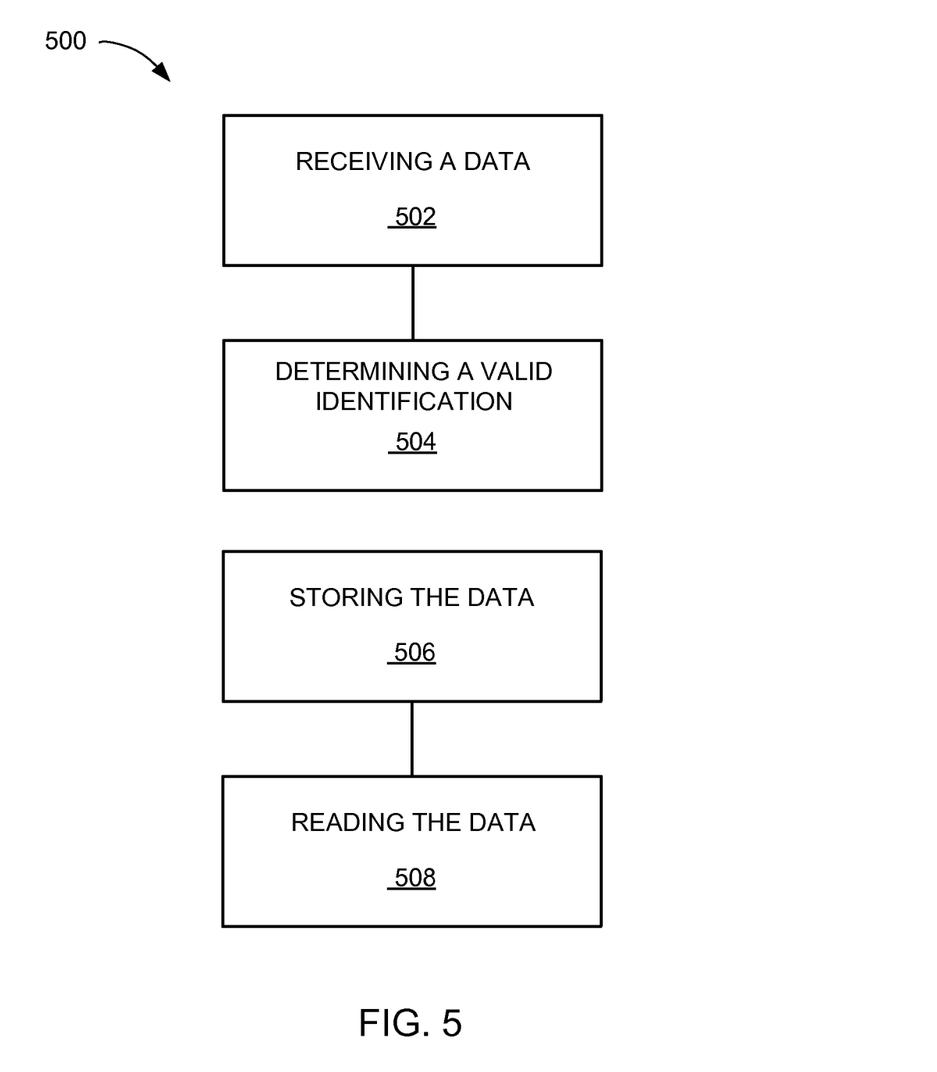
FIG. 5 is a flow chart of a method of operation of a computing system in an embodiment of the present invention.

Referring now to FIG. 5, therein is shown a flow chart of a method 500 of operation of a computing system 100 in an embodiment of the present invention. The method 500 includes: receiving a data in a write buffer entry for staging the data prior to transferring the data to a storage cell in a block 502; determining a validity identification of the data for a buffer entry address of the write buffer entry in a block 504; storing the data with a write buffer block based on the validity identification to the write buffer entry in a block 506; and reading the data for accessing the write buffer block in a block 508. The method 500 further includes: executing a speculative storage write based on a conflict status between a write request and the speculative storage write; preempting a speculative storage write between a write request and the speculative storage write; writing the data based on a bank busy flag; and overwriting the data already stored in the write buffer entry.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a write buffer block configured to:
receive a data in a write buffer entry for staging the data prior to transferring the data to a storage cell,
determine a validity identification of the data for a buffer entry address of the write buffer entry,
store the data based on the validity identification to the write buffer entry, and
a memory computing block, coupled to the write buffer block, configured to read the data from the write buffer block to execute a speculative storage write to the storage cell based on a conflict status between a write request and the speculative storage write for transferring the data to the storage cell.

2. The system as claimed in claim 1 wherein the write buffer block is configured to preempt a speculative storage write to the storage cell between a write request and the speculative storage write for transferring the data to the storage cell.

3. The system as claimed in claim 1 wherein the write buffer block is configured to write the data to the storage cell based on a bank busy flag.

4. The system as claimed in claim 1 wherein the write buffer block is configured to overwrite the data already stored in the write buffer entry.

5. A computing system comprising:
a host processor configured to:
generate a data,
execute a write request to be sent based on a number of a write buffer entry meeting or exceeding a usage threshold, and
a host interface, coupled to the host processor, configured to communicate the write request for transferring the data to a write buffer block prior to transferring the data to a storage cell by executing a speculative storage write to the storage cell based on a conflict status between the write request and the speculative storage write within a memory block.

6. The system as claimed in claim 5 wherein the host processor is configured to determine whether the data can be written based on a bank busy flag.

7. The system as claimed in claim 5 wherein the host processor is configured to determine whether the data can be written based on a bank busy flag for determining an availability of a bank of the storage cell.

8. The system as claimed in claim 5 wherein the host processor is configured to update a bank busy flag with a bank update command.

9. The system as claimed in claim 5 wherein the host processor is configured to release a write buffer entry based on the data for determining the data being transferred to the storage cell.

10. A method of operation of a computing system comprising:
receiving a data in a write buffer entry;
determining a validity identification of the data for a buffer entry address of the write buffer entry;
storing the data with a write buffer block based on the validity identification to the write buffer entry;
reading the data for accessing the write buffer block; and
executing a speculative storage write to a storage cell based on a conflict status between a write request and the speculative storage write for transferring the data to the storage cell.

11. The method as claimed in claim 10 further comprising preempting a speculative storage write to the storage cell between a write request and the speculative storage write.

12. The method as claimed in claim 10 further comprising writing the data to the storage cell based on a bank busy flag.

13. The method as claimed in claim 10 further comprising overwriting the data already stored in the write buffer entry.

14. A method of operation of a computing system comprising:
- generating a data with a host processor;
- executing a write request to be sent based on a number of a write buffer entry meeting or exceeding a usage threshold; and
- communicating the write request for transferring the data to a write buffer block prior to transferring the data to a storage cell by executing a speculative storage write to the storage cell based on a conflict status between the write request and the speculative storage write within a memory block.

15. The method as claimed in claim 14 further comprising determining whether the data can be written based on a bank busy flag.

16. The method as claimed in claim 14 further comprising determining whether the data can be written based on a bank busy flag for determining an availability of a bank of the storage cell.

17. The method as claimed in claim 14 further comprising updating a bank busy flag with a bank update command.

18. The method as claimed in claim 14 further comprising releasing a write buffer entry based on the data for determining the data being transferred to the storage cell.

* * * * *